Dec. 1, 1959

H. LARSEN ET AL 2,915,719

JUNCTION AND TERMINAL DEVICE FOR LAMINATED
HIGH-FREQUENCY CONDUCTORS

Filed March 2, 1955

Inventors:
Herbert Larsen
and
Horst-Edgar Martin

United States Patent Office 2,915,719
Patented Dec. 1, 1959

2,915,719

JUNCTION AND TERMINAL DEVICE FOR LAMINATED HIGH-FREQUENCY CONDUCTORS

Herbert Larsen, Berlin-Spandau, and Horst-Edgar Martin, Berlin-Siemensstadt, Germany, assignors to Siemens & Halske Aktiengesellschaft, Berlin-Siemensstadt and Munich, Germany, a corporation of Germany Application March 2, 1955, Serial No. 491,596

Claims priority, application Germany March 4, 1954

6 Claims. (Cl. 333—96)

Our invention relates to junction and terminal devices for high-frequency conductors composed of alternating thin layers of metal and insulating material for reducing skin effect. At the junction of such a laminated conductor with a coaxial or symmetrical line from which the conductor is to be excited, care must be taken to have the conversion of the transmitted energy from the wave form of the exciting line to the natural wave form of the laminated conductor occur with minimum losses. Cables and other wave propagation devices of this character are known in the art as illustrated, for example, in Australian Patent No. 151,466.

Relating to such junctions or coupling networks, it is the main object of our invention to provide a junction or terminal device that affords considerably smaller transmission losses than have been heretofore attainable.

To this end, and in accordance with a feature of the invention, we connect at the coupling or terminal portion of the laminated conductor the mutually insulated metal layers of the laminated conductor in groups or partial stacks with the tap points of a voltage divider network, and we adapt the divider output voltages of the network to the relative radii of the respective partial stacks so as to reduce the reflective attenuation as well as the coupling attenuation.

According to a more specific feature of the invention, we match the internal impedance of each individual divider section to the characteristic impedance of the particular partial stack of the laminated conductor that is connected across that divider section.

According to still another feature of our invention, the coupling network is essentially a multi-step voltage divider of complex impedance. It is particularly favorable to have such a coupling network consist of a transformer whose primary is connected to the exciting line and whose secondary has tap points connected to the respective partial stacks or groups of conductive laminae of the laminated conductor; and the transformer, preferably, has its number of winding turns dimensioned for also matching the low characteristic impedance of the laminated conductor with the high characteristic impedance of the connected line.

The present invention makes use of the fact that the transition attenuation is determined by two attenuation parameters, namely the reflection attenuation and the coupling attenuation. The reflection attenuation is essentially dependent only upon the characteristic impedance of the laminated conductor on the one hand and upon the characteristic impedance of the other or terminal conductor to be connected with the laminated conductor on the other hand. This component of attenuation can be reduced by inserting transformer or similar impedance matching components between the two lines which are to be connected with each other, as is also customary with conventional transmission lines, the transformers effecting an adaptation or matching of the respective characteristic impedances whereby reflections are minimized.

Generally, however, such impedance matching alone is not sufficient for reducing the transition attenuation to a satisfactory extent. There still remains a component attenuation, the so-called coupling attenuation, which is not influenced by the provision of an impedance matching transformer member and which in certain cases may result in a considerable attenuation loss. This coupling attenuation is essentially caused by the fact that the natural-frequency waves in the transmission line to be connected to the laminated conductor are, generally, different from the corresponding natural-frequency waves of the laminated conductor, thus causing the occurrence of parasitic waves of higher order which needlessly dissipate part of the useful transmitted energy.

In a junction or terminal device according to the invention, the coupling attenuation is reduced or effectively eliminated by providing a network with a series of taps so connected with the metal layers of the laminated conductor that the potential distribution impressed upon the metal layers is substantially coincident with the ideal potential distribution of a natural dominant wave, preferably the fundamental wave of the laminated conductor.

According to another feature of the invention, the internal impedance of the coupling network between each two adjacent taps is individually matched to the characteristic impedance of the partial stack or group of adjacent laminations of the laminated conductor connected intermediate two adjacent taps. By virtue of this feature, the reflection attenuation as well as the coupling attenuation in a junction or terminal device according to the invention are both minimized.

These and other features of the invention as well as further, more specific objects will be explained in detail with reference to embodiments of the invention illustrated in the drawing in which Fig. 1 shows, in longitudinal section, a laminated high-frequency conductor and a coupling network in accordance with the invention joining the conductor with a feeder line; and Fig. 2 is a cross section of the same laminated conductor.

In all illustrated embodiments of the invention, a multi-step voltage divider in form of a signal-wave transformed is used as the coupling network.

Figure 1:
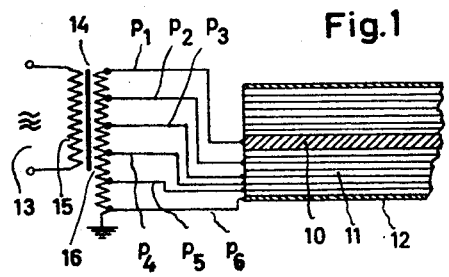
Figure 2:
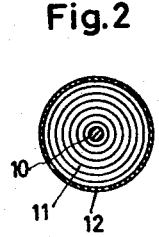
Figure 3:
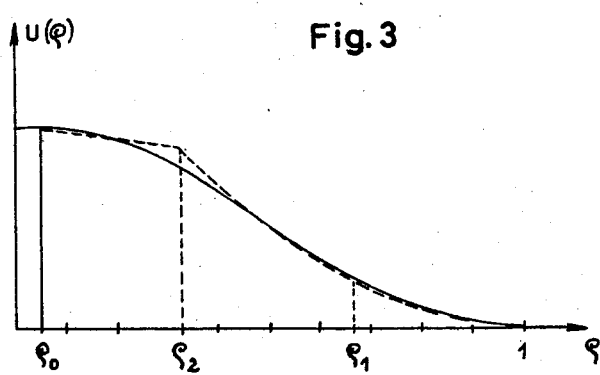
Fig. 3 is an explanatory, coordinate diagram relating to the coupled systems of Fig. 1.

The laminated high-frequency conductor according to Figs. 1 and 2 is composed of a central core 10 of good conducting material, a transmission medium consisting of alternate thin layers of metal and insulating material, and an outer good conducting metal sheath 12. The laminated conductor is shown connected with a feeder or connecting line 13, such as a coaxial or symmetrical cable. The connection is made through a multi-step coupling network. This network is essentially a multi-step voltage divider in form of a transformer 14 with a primary winding 15 and a secondary winding 16. The secondary winding 16, for providing a number of voltage steps, is tapped and has, for instance, six branch leads $p_1$ to $p_6$ individually connected with particular ones of the mutually insulated metal layers of the laminated conductor. As a result, the potential difference impressed upon the laminated conductor is so subdivided into graduated partial voltages that the distribution of the potential applied to the laminated conductor is closely coincident with the shape of the wave to be transmitted. Fig. 3 shows the voltage U in dependence upon the relative radius $\rho$ of the laminated conductor for the case of transmitting the dominant wave $E_1$, the relative radius $\rho$ being the ratio $r/r_c$ of the layer radius $r$ to the outer radius $r_c$ of the laminated conductor. The full-line curve in Fig. 3 denotes the ideal distribution of potential, and the broken-line curve indicates the approximate voltage distribution obtained by virtue of the invention. It follows that only a few taps or branch-off connections are needed for securing satisfactorily approximate coincidence of the two voltage curves and thus the desired potential distribution.

The invention, as exemplified by the above-described embodiment, will be further described and explained in mathematical terms. For this purpose consider the propagation of the coaxial dominant wave into the laminated conductor and its excitation to natural oscillations. Expressed in cylindrical coordinates $r$, $\varphi$, $z$ the field of the coaxial dominant wave is represented by the field magnitudes:

$$\sqrt{\rho}E_r = AZ_0(e^{-i\beta_0 z} - Re^{i\beta_0 z}) \frac{1}{\sqrt{\rho \ln \frac{\rho_0}{\rho_i}}} \quad (1)$$

in the range $$\rho_i < \rho < \rho_0$$

$$\sqrt{\rho}H_\varphi = AZ_0(e^{-i\beta_0 z} + Re^{i\beta_0 z}) \frac{2}{\sqrt{\rho \ln \frac{\rho_0}{\rho_i}}}$$

in the range $$\left.\begin{array}{l}\rho > \rho_i \\ \rho > 1\end{array}\right\} E_r = H_\varphi = 0$$

The terms used in these equations denote the following:

$\beta_0 = \frac{2\pi}{\lambda_0}$ : phase constant in the coaxial cable $Z_0$ : characteristic impedance in the coaxial cable $Z$ : characteristic impedance in the laminated conductor $R = \frac{Z_0 - Z}{Z_0 + Z}$ : reflection coefficient at the coupling plane $Z = 0$ $\rho = \frac{r}{r_c}$ : relative radius related to the outer radius $R_c$ of the laminated conductor $\rho_1, \rho_2$ : inner and outer radii respectively of the coaxial cable As mentioned, the laminated conductor being considered has a good conducting central core. The relative radius of this core is denoted by $\rho_0$. It is assumed that the thickness of the individual laminations, in comparison with the equivalent thickness of the conducting metal layers is sufficiently slight so that the field distribution can be represented by continuous functions. These result from solutions of the Maxwell equations for the transmission medium which, due to its stratification, has obtained anisotropic conductance. The solution of the differential Maxwell equations for the electric and magnetic field strengths $E_r$ and $H_\varphi$ leads to families of cylinder-coordinate Bessel and Neumann functions:

$$C_k(\rho) = I_1(s_k\rho) + D_k N_1(s_k\rho) \quad (2)$$

wherein the eigenvalues $s_k$ are the zero points of the equation $$N_1(s_k) I_1(s_k \rho_0) - I_1(s_k) N_1(s_k 0) = 0$$
$$k = 1, 2, 3, \ldots \quad (3)$$

This condition follows from the limit condition for disappearance of the magnetic field strength $H\varphi$ at the limit surfaces $\rho = \rho_0$ and $\rho = 1$. Denoting by $\gamma_k$ the propagation constant of the $k'$th natural oscillation, the magnetic and electric transverse component can be expressed by the infinite eigenfunction development $$\sqrt{\rho}H_\varphi = \sum_{k=1}^{\infty} B_k c_k(\rho) e^{-\gamma_k z}$$

$$\sqrt{\rho}E_r = Z \sum_{k=1}^{\infty} B_k c_k(\rho) e^{-\gamma_k z} \quad (4)$$

The terms $c_k(\rho)$ are the normalized eigenfunctions (provided with a normalizing factor) according to Equation 2:

$$c_k(\rho) = \frac{\sqrt{2\rho}}{C_0(s_k)\sqrt{1 - \rho_0^2 \cdot \frac{C_0^2(\rho_0 \cdot s_k)}{C_0^2(s_k)}}} C_1(s_k \rho) \quad (5)$$

Applicable to Equation 5 is:

$$\int_{\rho_0}^{1} c_k(\rho) c_e(\rho) d\rho = \begin{array}{l} 1 \ k = 1 \\ 0 \ k \neq 1 \end{array} \quad (6)$$

In the coupling plane $Z = 0$, the field components according to Equations 1 and 4 must equate with each other. Development of the Solution 1 for the coaxial feeder line likewise in terms of eigenfunctions $c_k(\rho)$ of the laminated conductor, results in:

$$\sqrt{\rho}H_\varphi = \sum_{k=1}^{\infty} a_k c_k(\rho) \quad (7)$$

for which equation the development coefficients $a_k$ are determined from Equation 6 as:

$$a_k = \int_{\rho_0}^{1} \sqrt{\rho} H_\varphi c_k(\rho) d\rho \quad (8)$$

The continuity condition in the coupling plane $Z = 0$ is determined from Equations 1, 4, 7, 8 as:

$$A(1+R)a_k = B_k$$
$$Z_0 A(1-R)a_k = Z B_k \quad (9)$$

If the calculation of the $a_k$ values is carried out according to Equations 1 and 8, then:

$$a_k = \sqrt{\frac{2}{\ln \frac{\rho_a}{\rho_i}}} \frac{C_0(s_k \rho_i) - C_0(s_k \rho_a)}{s_k C_0(s_k)\sqrt{1 - \rho_0^2 \frac{C_0^2(s_k \rho_0)}{C_0^2(s_k)}}} \quad (10)$$

The $B_k$ values of excitation are thus also known.

For generalizing the results with reference to a plurality of $n$ partial zones, assume the considered stack of laminations to be subdivided within the range $\rho_a \leq \rho \leq 1$ into $n$ partial stacks and apply the potential difference $\Delta U_v$ between the radii $\rho_v$ and $\rho_{v+1}$. The field strengths between the coaxial ring zones $\rho_v$, $\rho_{v+1}$ in the coupling zone $Z = 0$ are in accordance with the functions.

$$\sqrt{\rho}E_{rv} = \frac{\Delta U_v}{\ln \frac{\rho_v}{\rho_{v+1}}} \frac{1}{\sqrt{\rho r_c}}$$

$$\rho_{v+1} \leq \rho \leq \rho_v$$

$$\sqrt{\rho}H_\varphi = \frac{1}{Z}\sqrt{\rho}E_{rv} \quad (11)$$

The development into terms of eigenfunctions can be carried out in the above-mentioned manner and ultimately yields the coefficients $B_k$ in the form $$r_c Z B_k =$$

$$\frac{1}{s_k C_0(s_k)} \frac{\sqrt{2}}{\sqrt{1 - \rho_0^2 \frac{C_0^2(s_k \rho_0)}{C_0^2(s_k)}}} \sum_{v=1}^{n} \frac{\Delta U_v}{\ln \frac{\rho_v}{\rho_{v+1}}} [C_0(s_k \rho_{v+1}) \cdot C_0(s_k \rho_v)] \quad (12)$$

For drawing the power balance at the coupling location, the tapped coupling transformer is substantially considered to form $n$ generators having an E.M.F. equal to $U_{ov}$ and having an internal resistance $R_{iv}$. Generally, this internal resistance $R_{iv}$ in the $v$'th partial stack is different from the characteristic impedance $$Z_v = \frac{Z}{2\pi} \ln \frac{\rho_v}{\rho_{v+1}} \qquad Z = 377\Omega \qquad (13)$$

of that partial stack, and the voltage applied thereto is $$\Delta U_v = \frac{Z_v}{R_{iv} + Z_v} U_{ov} \qquad (14)$$

The total power input to the laminated conductor is $$N_c = \sum_{v=1}^{n} \frac{R_{iv} Z_v}{(R_{iv} + Z_v)^2} \cdot \frac{U_{ov}^2}{R_{iv}}$$

$$N_c = \frac{Z}{2\pi} \sum_{v=1}^{n} \frac{U_{v0}^2}{(R_{iv} + Z_v)^2} \ln \frac{\rho_v}{\rho_{v+1}} \qquad (15)$$

If the coupling network or transformer is dimensioned for impedance matching so that $$R_{iv} = Z_v \qquad (16)$$

then the power coupled into the laminated conductor is a maximum $$N_{c\,max} = \frac{\pi}{2Z} \sum_{v=1}^{n} \frac{U_{ov}^2}{\ln \frac{\rho_v}{\rho_{v+1}}} \qquad (17)$$

This input power distributes itself in accordance with the excitation strength values $B_k$ onto the dominant wave $k=1$ and onto the higher-order waves $k>1$. It can be shown that the attenuation constant $\alpha_k$ of the $k$'th higher-order wave increases proportionately with $s_k^2$. Consequently, at larger distances from the coupling place, only the dominant wave $E_1$ is virtually in existence so that the dominant wave is alone essential for the transmission effect. The power dissipation $y$ is defined as the ratio of the total power $N_{c\,max}$ supplied by coupling network or transformer, to the power $N_1$ in the dominant wave:

$$y = \frac{N_{c\,max}}{N_1} \qquad (18)$$

The power magnitude $N_1$ follows from Poynting's principle and Equations 4 and 6 as:

$$N_1 = 2\pi r_c^2 \int_{\rho_0}^{1} E_{r1} H_\varphi 1 d_\rho = 2\pi r_c^2 Z B_1^2 \qquad (19)$$

Consequently the power dissipation has the value $$y = \frac{1}{(2r_c Z B_k)^2} \sum_{v=1}^{n} \frac{U_{ov}^2}{\ln \frac{\rho_v}{\rho_{v+1}}} \qquad (20)$$

The first factor is to be substituted in accordance with Equation 12, and it will be seen that the power dissipation is dependent upon the radii $\rho_v$ and the applied voltages $U_{ov}$.

The invention, therefore, can be stated to require connecting the partial stacks or lamination groups of the laminated conductor to a corresponding number of sequential impedance sections or taps of the coupling network or transformer, and making the value of the power dissipation factor $y$, determined by Equations 12 and 20, as closely as possible equal to unity by means of correspondingly selecting the sectional voltages $\Delta U_v$ of the coupling network and the radii $\rho_v$ of the laminated conductor. With such a relative dimensioning of the $\Delta U_v$ and $\rho_v$ values, the reflective attenuation and the coupling attenuation are both reduced, and the dissipation of the incoming power of the laminated conductor into parasitic high-order wave forms is minimized.

Preferably used for the transmission is the dominant electric wave $E_1$ (the index 1 denoting the order number of the zero points of certain cylindrical functions). If the uniform propagation of the fundamental wave is disturbed by changes in the geometry of the laminated conductor itself or by the transfer to a coaxial supply line, then the energy is partly distributed onto the natural higher-order oscillations and this causes an additional or coupling attenuation which increases with increasing amplitudes of the higher-order waves. These amplitudes become larger, and the spectrum of the excited higher-order waves extends to larger order numbers, the more the wave form, dependent upon the configuration of the disturbance location, departs in the laminated conductor from the form of its natural dominant wave. As mentioned, for minimum energy losses in the coupling transformer, the inner impedance of each tapped-off portion of the coupling transformer is individually matched with the characteristic impedance of the corresponding partial stack of the laminated conductor; and the numbers of winding turns in the transformer are preferably dimensioned for matching the low characteristic impedance of the laminated conductor with the high characteristic impedance of the feeder or connecting line.

While in the embodiment described with reference to Figs. 1 to 3, the transmission medium of the laminated conductor is laminated throughout, the invention and the foregoing considerations are likewise applicable to conductors having a dielectric spacer between the central and outer conductor members. A conductor design of the latter type is tantamount to having the high-frequency conductor consist of a coaxial cable with a massive dielectric and forming each of the central and outer leads of alternate thin layers of metal and insulation.

Figure 4:
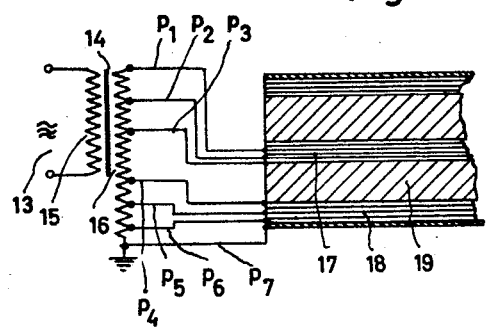
Fig. 4 illustrates another coupling system, the laminated conductor being shown in longitudinal section.
Figure 5:
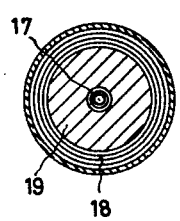
Fig. 5 is a cross section of the same conductor.
Figure 6:
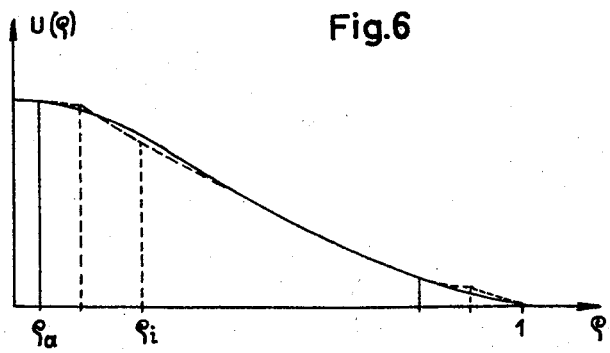
Fig. 6 is an explanatory diagram similar to Fig. 3 but relating to the system of Figs. 4 and 5.

An embodiment of this kind is shown in Figs. 4 and 5. The illustrated high-frequency conductor has a laminated central core member 17, a laminated outer member 18, and an intermediate solid dielectric body 19. The laminated conductor is coupled with a coaxial or symmetrical feeder line 13 by means of a transformer which corresponds to that of Fig. 1, as is apparent from respectively corresponding reference characters. However, the secondary winding 16 of the coupling transformer in Fig. 4 has seven branch leads $p_1$ to $p_7$ of which the leads $p_1$ to $p_3$ are connected to definite metal layers of the core member 18, while the leads $p_4$ to $p_7$ are connected to definite metal layers of the outer member 18. Fig. 6, which is analogous to Fig. 3, indicates the radial potential distribution of the cross section of the laminated conductor by showing in full line the ideal condition, and in broken line the approximation attained by virtue of the invention.

Figure 7:
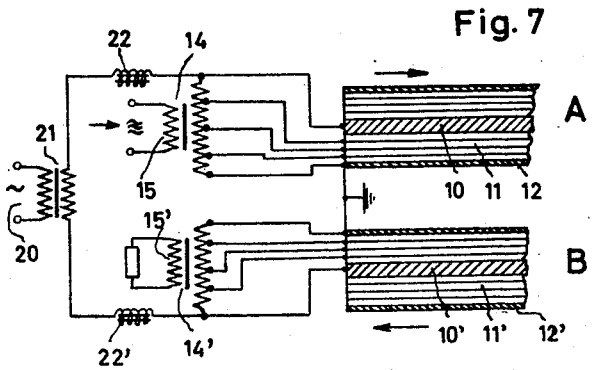
Fig. 7 shows still another embodiment of a coupling system designed for supplying power to amplifiers that may be inserted into a train or series of individual lengths of laminated high-frequency conductors.

The provision of the central, good conducting core 10 in a high-frequency conductor laminated throughout according to Figs. 1 and 2, also affords using the core for other transmission purposes, for instance for supplying energizing current to amplifiers inserted into the high-frequency conductor train. An embodiment of this type is illustrated in Fig. 7. The transmission system comprises two separate cables A and B, each consisting of a laminated conductor similar to the one shown in Figs. 1 and 2. The conductive cores are denoted by 10 and 10', the laminated transmission media by 11 and 11', and the exterior metal sheaths with 12 and 12'. The power supply circuit 20 for supplying energizing current is connected with the conducting cores 10 and 10' of the two cables A and B through a transformer 21 and through series-connected reactor coils 22 and 22'. The multi-step coupling transformers are designed in principle as in Fig. 1 and are denoted by 14 and 14' respectively.

The invention is not limited to the particular embodiments specifically described and illustrated. For instance instead of the illustrated networks consisting of voltage dividers and subdivided transformers, other voltage dividing networks may be applied. The invention is also applicable for matching the laminated conductor with amplifiers inserted into the transmission channel. For instance, in the embodiment of Fig. 7, the amplifiers interposed into the transmission channel and located at a distance from each other can be coupled with the laminated conductors through the coupling transformers 14 and 14'. Such and other modifications and applications of the invention will be apparent to those skilled in the art upon a study of this disclosure without departure from the essential features of our invention and within the scope of the claims annexed hereto:

We claim:

1. In combination a high frequency transmission line comprising a series of spaced laminae of conducting material disposed to reduce skin effect at said high frequency, a terminal coupling network having a primary circuit and a secondary circuit, one of said two circuits forming a voltage divider and having a series of tap points connected in sequence to respectively different ones of said laminae, said voltage divider being the only high-frequency source of said transmission line, the voltage distribution among said laminae connected to said tap points at least approximating the ideal voltage distribution thereamong without said coupling network for the natural dominant wave of said transmission line, whereby, with said network connected to said transmission line, the generation of parasitic wave forms of order higher than said dominant wave form is effectively prevented.

2. A terminal coupling network according to claim 1, in which the internal impedance of said network intermediate every two adjacent ones of said tap points is individually matched to the characteristic impedance of that portion of said transmission line constituted by those laminae which are included between said adjacent tap points when said transmission line is connected to said network.

3. A high frequency wave energy translation system comprising in combination, a first transmission line having a relatively high impedance, a second transmission line having a relatively low impedance and including an alternating series of electrically conductive and electrically insulative layers for reducing skin effect losses in said second line, and a coupling device interconnecting said first and second lines, said coupling device comprising a primary winding connected to said first line and having an impedance matched to the impedance of said first line for reducing reflections between said first line and said primary winding, and voltage dividing means coupled to said primary winding and connected to said second transmission line, said voltage dividing means comprising a series of tap points connected in sequence to respectively different ones of said electrically conductive layers and being the only high-frequency source of said second transmission line, the voltage distribution between said tap points conforming at least approximately to the voltage distribution among said layers with said second line disconnected from said coupling means and energized independently by the natural dominant wave of second transmission line.

4. A wave translation system according to claim 3, in which the impedance looking back into two adjacent ones of said tap points and with said second transmission line disconnected, matches the characteristic impedance of that portion of said second transmission line which is constituted by said predetermined ones of said layers which are connected to said two adjacent tap points including such further layers as may be disposed between said two layers connected to said adjacent tap points.

5. A high frequency energy distribution system comprising in combination, a transformer having a primary winding and a secondary winding, said secondary winding having series of spaced tap points thereon; a first transmission line of relatively high impedance connected to said primary winding, the impedance of said primary winding being matched to the characteristic impedance of said first line; and a second transmission line of relatively low impedance connected to said secondary winding, said second line comprising a series of coaxial tubular conductors electrically insulated from each other for reducing skin effect losses in said second line, predetermined ones of said tubular conductors being connected to respective ones of said tap points, said tap points in totality being the only high-frequency source of said second transmission line, and the radial voltage distribution among said conductors caused by said connection to said tap points conforming at least approximately to the voltage distribution of the natural wave of said second line, whereby substantially only the dominant natural wave is excited in said second line by the energy supplied from said first line.

6. A high frequency energy distribution system comprising in combination, a transformer having a primary winding and a secondary winding, said secondary winding having series of spaced tap points thereon; a first transmission line of relatively high impedance connected to said primary winding, the impedance of said primary winding being matched to the characteristic impedance of said first line; and a second transmission line of relatively low impedance connected to said secondary winding, said second line comprising a series of coaxial tubular conductors electrically insulated from each other for reducing skin effect losses in said second line, predetermined ones of said tubular conductors being connected to respective ones of said tap points, said tap points in totality being the only high-frequency source of said second transmission line, the impedance between every two adjacent ones of said tap points independently matching the impedance of the particular portion of said second line which is defined by said conductors connected to said adjacent tap points, and the radial voltage distribution among said conductors caused by said connection to said tap points conforming at least approximately to the voltage distribution of the natural wave of said second line, whereby substantially only the dominant natural wave is excited in said second line by the energy supplied from said first line.

References Cited in the file of this patent

UNITED STATES PATENTS

| | | |
|---|---|---|
| 1,750,111 | Mahlke | Mar. 11, 1930 |
| 2,769,147 | Black | Oct. 30, 1956 |

FOREIGN PATENTS

| | | |
|---|---|---|
| 151,466 | Australia | May 18, 1953 |